United States Patent [19]
Johnson

[11] 3,747,401
[45] July 24, 1973

[54] ENERGY METER USING GAS AS AN ENERGY ABSORBER

[75] Inventor: Derwyn C. Johnson, Ottawa, Ontario, Canada

[73] Assignee: Her Majesty the Queen in right of Canada as represented by the Minister of National Defence of Her Majesty's Canadian Government

[22] Filed: Aug. 20, 1970

[21] Appl. No.: 65,583

[30] Foreign Application Priority Data
Aug. 29, 1969 Canada .............................. 060,796

[52] U.S. Cl. ........................ 73/190 R, 250/83.3 H
[51] Int. Cl. ...................... G01k 17/00, G01t 1/205
[58] Field of Search ................ 73/190; 250/83.31 R

[56] References Cited
UNITED STATES PATENTS

| | | |
|---|---|---|
| 3,483,747 | 2/1969 | Soffer et al. ........................... 73/190 |
| 2,850,611 | 9/1958 | Brandl ............................... 73/368.7 |
| 3,230,774 | 1/1966 | Ostrow .............................. 73/368.7 |
| 3,487,685 | 1/1970 | Shifrin ................................ 73/190 |
| 3,670,570 | 6/1972 | Briones .............................. 73/190 |
| 3,659,452 | 5/1972 | Atwood .............................. 73/190 |
| 1,980,213 | 11/1934 | Lindsay ............................... 73/355 |
| 3,251,228 | 5/1966 | Hanebuth ......................... 73/368.6 |
| 3,282,100 | 11/1966 | Baker ................................. 73/190 |

Primary Examiner—Herbert Goldstein
Attorney—Cushman, Darby and Cushman

[57] ABSTRACT

An energy measurement cell is disclosed in which an absorbing gas is contained which absorbs the energy of an incident pulse of infra-red energy, and undergoes a pressure rise which is sensed by a pressure transducer to given electrical output proportional to the energy absorbed by the cell. Sulfur hexafluoride is disclosed as an absorbing gas which may be mixed with a buffer gas such as argon to improve the operation of the cell.

2 Claims, 1 Drawing Figure

PATENTED JUL 24 1973 3,747,401
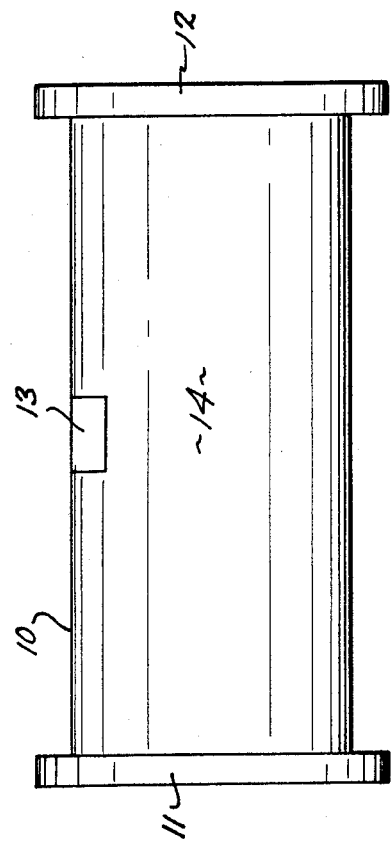

ENERGY METER USING GAS AS AN ENERGY ABSORBER

The present invention relates to an energy measuring device and in particular a device for measuring the energy contained in an infrared light pulse such as produced by a $CO_2$ laser.

Difficulties have been experienced in utilizing known devices for detecting and measuring the energy in high power infrared pulses produced by $CO_2$ lasers, particularly because of the increased reflectivity of metals in the infrared range resulting in not all the incident energy being absorbed in the measuring device.

The present invention provides an improved energy measurement device which is particularly well suited for measurements in this infrared range. The present invention utilizes the pressure increase in an absorbing gas or gas mixture when radiation is absorbed by the gas which is contained in a closed volume. The pressure increase is detected by a pressure transducer which generates an electrical signal proportional to the pressure increase and to the amount of energy incident on the detector.

If a light pulse is uniformly absorbed in a gas, the gas temperature rises, resulting in a pressure increase. Using the ideal gas law, the pressure increase is given by $$\Delta P = (760/273.18)(E/\rho_o C_v V) \text{ torr} \quad (1)$$

where
$\Delta P$ is the pressure increase
$E$ is the energy in the light pulse
$C_v$ is the specific heat at constant volume of the gas
$V$ is the volume of the container
$\rho_o$ is the density of the gas at S.T.P.

Note that the pressure increase is independent of the pressure in the cell.

The accompanying drawing is a side elevation of a detector of the present invention. As shown the detector comprises a cell 10 in the form of a cylinder. One end of the cell 10 is sealed by a sodium chloride window 11 and the other end of the cell 10 is sealed with a gold-coated reflector 12. Within the volume of the cylinder 10 an absorbing gas such as sulphur hexafluoride ($SF_6$) 14 is contained. In order to assure that the absorbed energy is distributed along the cylinder's axis, the gas pressure should be as low as possible, but still sufficiently high to absorb all the energy contained within the pulse. A buffer gas such as argon is required to increase the vibrational-translational energy transfer rate and prevent absorption saturation which decreases the energy absorption by the gas and subsequent infrared reradiation. Increases in the pressure of the absorbing gas due to incident energy are measured by means of a pressure transducer 13 having a fast response mounted in the side of the cylinder. Such a transducer is a Pitran which is a commercial device available from Stow Laboratories Inc. Model No. PT-2. The Pitran 13 is a differential pressure transducer and accordingly it is sealed in a second smaller cell connected to the absorbing chamber through a valve which can be used to equalize the pressure in the two cells. A commercially available Pitran has a sensitivity of 108 mv/Torr and a frequency response to 100 KHz. To detect the pressure changes in the cell the Pitran is connected to a cathode ray oscilloscope.

In order to study the response of the energy meter of the present invention a series of experiments were carried out on an energy meter in which the cell was a cylinder 3.8 mm in diameter by 24 cm long containing sulphur hexafluoride ($SF_6$) as the absorbing gas specified above. Since the absorption coefficient of $SF_6$ is about $0.4 \text{ cm}^{-1} \text{ Torr}^{-1}$, gas pressures of approximately 1 Torr are required for this cell. At these low pressures, complications arise. It is possible to saturate the $SF_6$ with small intensities (10 watts/cm$^2$) so that the cell becomes partially transparent. Furthermore, any absorbed energy may not be converted into thermal energy, but may be reradiated in the form of infrared light. Therefore the gas pressure was increased to 760 Torr by the addition of argon as a buffer.

To study the response of the energy meter, a square light pulse 21 millisec long was generated by a shutter in the beam of a CW $CO_2$ laser. It was found that the pressure increases linearly for 21 ms and then decays exponentially. For the peak height of the pressure signal to be proportional to the absorbed energy, the light pulse width should be much shorter than the decay time. This letter quantity is determined by heat conduction through the gas to the walls, i.e., the thermal diffusivity of the gas. In the case of 1 Torr $SF_6$ and 760 Torr Argon, decay times of 0.5 sec were observed. These are shorter than the times calculated for heat conduction in infinite cylinders. There are, however, additional heat losses through the ends of the cylinder. Furthermore, the decay curves have a discontinuity after 0.2 sec. indicating an increased heat transfer rate through the onset of convection. A check on the variation of the pressure change with total gas pressure indicated that between 200 and 760 Torr, the energy meter sensitivity was constant as expected from equation 1. Below 200 Torr it decreases, becoming zero at zero Torr. This latter effect is probably due to the decreased absorbed energy in the cell at these pressures. It was also found, that for a constant total pressure (760 Torr) the energy meter response varied with the $SF_6$ pressure. For a $SF_6$ pressure change from 1 to 5 Torr the meter sensitivity decreased by 10 percent. Variations in the $SF_6$ pressure cause changes in the initial gas temperature distribution. In particular, the gas temperature close to the NaCl window increases with increasing $SF_6$ pressure. The resulting decrease in meter response may indicate that there is a rapid heat loss to the window during the build-up in the pressure signal. Of course the meter response was zero for zero $SF_6$ pressure. The effect of different buffer gases was also studied. The results could be explained in terms of equation 1 and the different gas diffusivities. For example, argon and helium have similar products of specific heat times density resulting in similar pressure changes but the decay time for the latter is much more rapid due to its high diffusivity. A number of gases may be used simultaneously to increase the useful spectral range of the energy meter. Such gases include, for example boron trichloride and propane.

A difficulty encountered was the calibration of the $SF_6$ energy meter. Since it is highly wavelength selective it could only be calibrated with light pulses from a $CO_2$ laser with a Coherent Radiation Lab. average power meter and then generating the pulses with a shutter of a known exposure time. Using this procedure, a sensitivity of 1.35 volts/joule was determined for the above meter. This includes a correction for the 8 percent Fresnel reflection losses at the NaCl windows. Using the Pitran sensitivity, the meter sensitivity was determined to be 12.5 Torr/joule. This should be compared with the 16.5 Torr/joule predicted by equation 1, i.e., 27 percent difference. One possible source of error is the average power measurement. Although the Coherent Radiation Lab. meters are stated to be accurate to within 5 percent, a relative comparison of four such meters found agreements to only within 25 percent.

A problem encountered during operation of the energy meter of the present invention is the appearance of an oscillation which may be a pressure oscillation signal when short light pulses of less than 1 microsecond are observed in the cell. Another possible problem encountered in the use of the cell is decomposition of the sulphur hexafluoride at high intensities.

However, it should be borne in mind that several advantages are obtained with the cell of the present invention. For example the cell operates on direct gas absorption and requires no beam focussing, this cell has a high sensitivity and a large volume to distribute the incident energy. It is also faster than solid ballistic devices which require minutes between successive measurements.

I claim:

1. A gas energy meter for 10.6 microns light from a $CO_2$ laser comprising a cylinder 3.8 cm in diameter and 24 cm long sealed at one end with a sodium chloride window; and at the other end with a gold-coated reflector, a gas mixture enclosed within said cell consisting of 1 Torr sulphur hexafluoride and 760 Torr of argon, a pressure transducer mounted in the side of the cylinder cell to provide an electrical output indicative of pressure changes in the cell.

2. Apparatus for measuring the energy in an incident pulse of infrared radiation comprising a sealed container, a window transparent to infrared radiation in a wall of said container, the opposite wall of said container being provided with a reflector, a minor proportion of radiation absorbing gas being absorbent at the frequency of said infrared radiation, a major proportion of a buffer gas to increase the vibrational-rotational energy transfer rate and prevent absorption saturation of said absorbing gas and subsequent infrared reradiation, said radiation absorbing gas and said buffer gas being in said container, whereby substantially all of the infrared radiation transmitted through said window is absorbed, and a pressure transducer mounted in communication with the interior of said sealed container to provide an electrical signal proportional to changes in the pressure in said container caused by the energy absorbed by said cell.

* * * * *